(12) United States Patent
Maruta

(10) Patent No.: US 6,695,417 B2
(45) Date of Patent: Feb. 24, 2004

(54) CABINET

(75) Inventor: Naoto Maruta, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/951,897

(22) Filed: Sep. 14, 2001

(65) Prior Publication Data

US 2002/0036449 A1 Mar. 28, 2002

(30) Foreign Application Priority Data

Sep. 14, 2000 (JP) .................................... 2000-006686 U

(51) Int. Cl.⁷ ................................................ A47B 81/06
(52) U.S. Cl. ...................................................... 312/7.2
(58) Field of Search ............................. 312/7.2, 223.1, 312/223.2; 348/836; 361/681, 682; 248/917, 918

(56) References Cited

U.S. PATENT DOCUMENTS

| | | | | |
|---|---|---|---|---|
| 5,041,944 A | * | 8/1991 | Campisi | 361/682 |
| 5,654,778 A | * | 8/1997 | Higuchi et al. | 348/836 |
| 5,863,106 A | * | 1/1999 | Beak | 312/7.2 |
| 5,999,233 A | * | 12/1999 | Park | 312/7.2 X |
| 6,046,783 A | * | 4/2000 | Park | 348/836 |

FOREIGN PATENT DOCUMENTS

CA 851612 * 9/1970 ................. 312/7.2

* cited by examiner

*Primary Examiner*—James O. Hansen
(74) *Attorney, Agent, or Firm*—Crowell & Moring LLP

(57) ABSTRACT

In the case where the cabinet has many long segments, it takes a long period of time until they are cooled in a die. In addition, looseness was produced between the board and the guide rail due to a presence of pulling taper and this looseness became a cause of generating vibrating sound. There are constituted integral molded guide rails integrally molded with the casing to support the front end of the board when the board is stored in a casing along a predetermined wall surface, and a board holder constituted as a separate component from the integral molded guide rail, capable of sliding the board and inserting it. Accordingly, it is not necessary to oppositely face a long rail having the substantial same length as that of the board as the integral molded guide rail and so a speed in which the molded product is cooled in a die is made fast. Further, since the board holder is a separate component element, looseness between the board and the guide rail can be easily reduced.

11 Claims, 10 Drawing Sheets

CABINET

BACKGROUND OF THE INVENTION

1. Field of the Invention

This invention relates to a cabinet.

2. Description of the Prior Art

FIG. 10 is a perspective view for showing a front cabinet of the prior art Television (hereinafter, abbreviated to TV) device. In this figure, the front cabinet 1 is a resin molded product molded through a predetermined die, the front cabinet 1 is pulled out in a direction indicated by an arrow A after being cooled in the die. In this case, in order to prohibit the pulling-out operation, the rails 2 supporting the board are provided with a pulling taper along the direction of aforesaid arrow A, and the width W1 shown in this figure is slightly smaller than the width W2. Further, an electric circuit of the TV device is printed on a printed circuit board, wherein the printed circuit board is held on the rails 2 at both ends, the printed circuit board is inserted into the device while being guided by the rails 2, and arranged at its predetermined position.

In turn, the gazette of Japanese Utility-Model Laid-Open No. Sho 61-7089 discloses a technology in which parallel supporting rails having engagement portions are integrally molded at both sides of the bottom surface constituting the outer casing and the board supported at the supporting rails is fixed by the board holder capable of being engaged with the engagement portions.

The aforesaid prior art front cabinet had the following problems.

That is, the former was constructed such that both pairs of rails 2 were constructed to have substantially the same length as that of the board and such a long location reduced the cooling speed when the aforesaid molding was carried out. In addition, since the clearances of the pairs of rails were slight due to the presence of the aforesaid pulling taper, the board was tightly held by the rails 2 near the width W1 when the board was actually inserted into the device, looseness was generated between the board and the rail 2 near the width W2, vibration of a speaker or the like of the TV device was transmitted to generate a so-called vibrating sound.

Even with the latter case, the supporting rails are certain long members and it is not possible to make a fast speed of cooling speed when the molding operation is carried out. Further, it is not possible to prevent the vibrating sound from being generated at the location other than the board holder.

SUMMARY OF THE INVENTION

The present invention has been invented in view of the aforesaid problem, wherein it is an object of the present invention to provide a cabinet capable of speeding-up the molding speed of the molded product and reducing a vibrating sound of the completed product.

The cabinet provided by the present invention is a cabinet in which when the board is stored in a casing along a predetermined wall surface, the wall surface is provided with groove-like guide rails capable of inserting the edge of the board from one end to the deeper side and supporting it, and the end portion of the groove-like guide rail can be fixed or removed.

In the present invention constructed as described above, the end portion of the groove-like guide rail to insert the aforesaid board can be fixed or removed and this is separately formed when molded. That is, if the long groove-like guide rails are formed, it is necessary to have a sufficient pulling taper, since it becomes a separate component element, the slight pulling taper is sufficient.

Accordingly, in accordance with the present invention, it is possible to provide a cabinet in which no looseness is generated and a vibrating sound cannot be generated.

More practically, there is provided a cabinet in which a board is supported by groove-like guide rails capable of inserting edges of said board when the board is stored in a casing along a predetermined wall, wherein, the same is comprised of integral molded guide rails integrally molded with the aforesaid casing and supporting a front end of the aforesaid board; and a board holder formed at a lower end in an engageable or fixable manner in such a way that it is vertically installed against the aforesaid wall surface, formed at an upper end with the aforesaid groove-like guide rails in a direction substantially crossing at a right angle with a vertical installing direction and capable of sliding and inserting the aforesaid board under the engaged and fixed state.

In such a configuration as described above, when the board is stored in a casing along the predetermined wall surface, the board can be supported by the groove-like guide rails into which the edges of the board can be inserted. Due to this fact, the integral molded guide rails are integrally molded with the aforesaid casing to support the front end of the board. In addition, the board is also supported by the board holder which is a separate component element of the integral molded guide rail, the board holder can be engaged with and fixed at its lower end in a vertical installed state against the aforesaid wall surface, and its upper end is formed with the aforesaid groove-like guide rail in a direction substantially crossing at a right angle with a vertical installing direction. Further, the board holder enables the aforesaid board to be slid and inserted under a state in which it is engaged with and fixed to the aforesaid wall surface.

That is, the board is supported not only by the integral molded guide rails integrally molded with the predetermined wall surface in the casing, but also by the board holder of a separate component element, so that it is not necessary to make an opposite arrangement of a long rail or the like having a substantial same length as that of the board as the integral molded guide rail found in the aforesaid cabinet, and a speed where the molded product is cooled in the die is made fast.

Accordingly, in accordance with the present invention, it is possible to provide a cabinet in which it is not necessary to construct the long rail having the substantial same length as that of the board as the integral molded guide rail and a speed in which the molded product is cooled in a die can be made fast.

In the specification of the present invention, the sliding direction when the board is slid and inserted is set as a forward or rearward direction of the board and its inserting direction is set from the rear side to the forward side. Accordingly, the front end of the board is an edge of the board where it becomes the forward-most end when inserted. In addition, a size in a direction parallel with the forward or rearward direction at an inserting plane of the board is defined as a length of the board and a size in the direction perpendicular to the forward or rearward direction is defined as a width of the board.

At the integral molded guide rails, it is satisfactory that the front end of the board can be supported, and not only the configuration for molding the guide rails covering the front end edge, but also various kinds of configuration can be employed.

For example, if the guide rails are constituted at both ends in the width direction of the board, both ends in the width direction of the board, both ends in the width direction of the board can be supported under a state in which the board is inserted into the guide rails, the front end of the board can also be supported, resulting in that it is possible to say that in view of this fact the guide rails support the front end of the board. Further, it is also possible to provide a configuration in which both guide rail covering the front end of the board and the guide rail supporting both ends in the width direction are supported.

In this case, it is satisfactory that the aforesaid integral molded guide rails may guide the board and support the board slid and inserted along the predetermined wall surface in the aforesaid casing, and various kinds of configuration can be employed. For example, if both ends of the aforesaid board in the width direction are supported from above and below and the rails for guiding the board to the predetermined position are constructed, the board composed of a plate member can be guided to the predetermined position while being inserted into the rails.

As described above, the board is removably installed, resulting in that the aforesaid integral molded guide rails are not necessarily elongated than desired value. As one example of the configuration, the aforesaid integral molded guide rails are molded to be oppositely faced to each other, they are molded to support each of the left end and the right end of the aforesaid board, at least one of the aforesaid molded guide rails can be constituted to have a length of about ¼ to about ½ of the length of the aforesaid board. That is, the intergral molded guide rails are oppositely faced to support each of the left end and the right end of the aforesaid board. Then, at least one of the opposing intergal molded guide rails is remarkably short as compared with a length of the board and a speed where the aforesaid intergal molded guide rails are cooled in the die is made fast.

In this case, it is satisfactory that the intergal molded guide rails have a length of such a degree as one in which the cooling speed in the die is made fast as compared with that of the aforesaid prior art front cabinet and rather it is not necessary that it is strictly in a range of ¼ to ½ of the length of the board. It is satisfactory that the approximate ¼ of the length of the board is satisfactory if the board is supported stably and since the board is also supported by the aforesaid board holder, resulting in that the allowable minimum value of the length at the integral molded guide rail becomes substantially shorter than ¼.

Further, in accordance with another preferred embodiment of the present invention, the cabinet can be constituted such that it is molded in a predetermined die; and there is provided a pulling taper in which a distance between the aforesaid oppositely faced integral-molded guide rails is gradually shortened as the aforesaid cabinet is pulled out of the die. In this case, since the integral molded guide rails are provided with the pulling taper, the molded product can be easily pulled out after being cooled in the die.

In accordance with another preferred embodiment of the present invention, the aforesaid board holder is formed with engagement claws having substantial L-shaped section at the lower part, engagement holes capable of being engaged with the engagement claws are arranged at positions fixing the board holders at a predetermined wall surface in the casing, the board holder is moved in the substantial same direction as that of sliding the board when the board is supported at the integral molded guide rails, thereby the engagement claws are engaged with the engagement holes.

In the case where the invention is constructed as described above, the board holder is fixed under engagement between the engagement claws and the engagement holes. Due to this fact, the lower part of the board holder is formed with the engagement claws having the substantial L-shaped section and the board holder fixing position at the predetermined wall in the casing is provided with the engagement holes where the engagement claws can be engaged. Then, when the board is supported by the integral molded guide rails, the board holder is moved in the substantial same direction as that of sliding the board to cause the engagement claws to be engaged with the engagement holes.

That is, the direction where the board is slid while being guided and the direction where the board holder itself is moved to fix the board holder to a predetermined wall surface in the casing are substantially the same, the board is arranged up to the predetermined position, thereby the board holder can be prevented from being dropped and further the board holder can be fixed more tightly. Due to this effect, irrespective of fixing it by an easy method of engagement, the board holder can be fixed positively.

Further, in accordance with another preferred embodiment of the present invention, the aforesaid board holder can be engaged with and fixed to a position where the aforesaid board holder is biased toward the aforesaid board when the aforesaid board is supported. With such a configuration as above, when the board is supported, the board holder is biased toward the board, so that even in the case where a spatial looseness is generated between the board and the guide rail due to the aforesaid pulling taper, such looseness as above can be eliminated by biasing the board holder, the board can be positively abutted and supported to prevent a vibrating sound from being generated.

Although the aforesaid pulling taper is advantageous in view of constituting the molded product manufactured by a die, it is only constructed such that if the long integral molded guide rails are constituted as found in the aforesaid prior art, a vibrating sound is generated, so a non-woven fabric is placed between the board and the integral molded guide rail to prevent the vibrating sound from being generated. However, the board holder is supported while biasing against the end part of the board not supported by the integral molded guide rail enables the vibrating sound to be easily prevented from being generated without using any non-woven fabric even in the constitution providing the pulling taper.

Further, in accordance with another preferred embodiment of the present invention, the aforesaid engagement holes are arranged at a plurality of positions in a predetermined wall surface in the aforesaid casing and the aforesaid board holder can be engaged at a plurality of positions. In the case where the invention is constructed as above, the aforesaid engagement holes are arranged at a plurality of positions. Accordingly, the aforesaid board holder can be engaged at a plurality of positions and it can be easily adapted for the case where the width of the board is to be changed due to modification in design or a model change or the like or the case where the width of a sheet of board is changed.

Further, in accordance with another preferred embodiment of the present invention, the guide rails of the aforesaid board holders are provided with protrusions abutted against either an upper end or a lower end of the aforesaid board or both of them. In the case where the invention is constituted as above, the protrusions arranged at the aforesaid guide rails are abutted against either the upper end or the lower end of the aforesaid board or both of them.

That is, if the grooves of the guide rails are constituted to have the substantial same length in thickness of the board, insertion of the board becomes difficult, resulting in that too much amount of size of the guide rail in the thickness direction of the board may cause looseness. However, arrangement of the protrusions enables looseness to be easily prevented from being generated without decreasing or increasing the groove width of the guide rails more than that required.

Further, in accordance with another preferred embodiment of the present invention, the aforesaid board holder is formed with a flexible piece at its lower part having a flexible characteristic and with a protrusion at its end part directed toward a predetermined wall surface in the aforesaid casing, the predetermined wall in the aforesaid casing is formed with a stopper hole to which the aforesaid protrusion can be fitted, the aforesaid protrusion and the aforesaid stopper hole are fitted under a state in which the aforesaid engagement claws are engaged with the engagement holes, thereby the board holder is prevented from being moved in such a direction as one in which the engagement between the engagement claws and the engagement holes is released.

In such a configuration as described above, the board holder is formed with the flexible piece and the predetermined wall surface in the aforesaid casing is formed with a stopper hole. The flexible piece is provided with a protrusion directed toward the predetermined wall surface in the aforesaid casing and the stopper hole is provided with the aforesaid protrusion in such a way that it can be fitted, so that the aforesaid protrusion and the stopper hole are fitted to each other under a state in which the aforesaid engagement claws are engaged with the engagement holes, thereby the board holder is prevented from being moved in a direction where the engaged state between the engagement claws and the engagement holes is released. That is, the fitting between the protrusion of the aforesaid flexible piece and the stopper hole prevents the board holder from being dropped automatically after the board holder is once fixed. Further, since the aforesaid flexible piece is biased against the predetermined wall surface in the casing due to its flexing characteristic, looseness is reduced at the wall surface and the board holder to prevent vibrating sound from being generated.

In this case, it is possible to prevent looseness from being generated at the predetermined wall surface and the board holder and to prevent the board holder from being automatically dropped after the board holder is once fixed.

Further, in accordance with another preferred embodiment of the present invention, when a weight of circuit components installed on the aforesaid board may act eccentrically on a predetermined position of the aforesaid board, the aforesaid integral molded guide rails are arranged such that the end near the acting position of the aforesaid weight is supported. That is, the heavy weight portion is supported by the long integral molded guide rail integrally formed with the casing to enable the board to be positively supported.

Further, in accordance with another preferred embodiment of the present invention, there is provided a cabinet covering a circumferential edge of a fluorescent surface of a Picture tube of a TV device, extended to cover the bottom surface of the TV device and supporting a board substantially in parallel with the aforesaid bottom surface, wherein the same is comprised of a first integral molded guide rail having a substantial same length as that of the aforesaid board in which it is integrally molded in a substantial parallel direction in a forward or rearward direction of the aforesaid TV device inside the bottom surface of the TV device formed by the aforesaid cabinet, it is vertically installed in a substantial F-shaped section from the aforesaid bottom surface toward inside the TV device, it can be slid, inserted and supported while the end parts of the aforesaid board are being held in its thickness direction by substantial parallel two planes at the bottom surface of the aforesaid substantial F-shaped section; a second integral molded guide rail having a substantial ⅓ of a length of the aforesaid board in which it is integrally molded in a substantial parallel direction in a forward or rearward direction of the aforesaid TV device inside the bottom surface of the TV device formed by the aforesaid cabinet, it is vertically installed in a substantial F-shaped section from the aforesaid bottom surface toward inside the TV device so as to be oppositely faced against the aforesaid first integral molded guide rail, it can be slid, inserted and supported while the end parts of the aforesaid board are being held in its thickness direction by substantial parallel two planes at the bottom surface of the aforesaid substantial F-shaped section; aboard holder comprised of a vertical installing portion formed, at its upper part, with two surfaces holding the end parts of the aforesaid board from a thickness direction and capable of supporting the board while being abutted against the end parts of the board with predetermined protrusions, and vertically installed to enable the aforesaid two surfaces to support the board at a similar height as that of the board supported by the aforesaid second integral molded guide rail, an extended portion extended in a flange manner against the vertical installing portion and engagement claws engageable with predetermined engagement holes arranged at the bottom surface of the aforesaid TV device at the lower part of the extended portion; and wherein, the aforesaid board is slid and inserted against the substantial parallel two planes to the bottom surface of the substantial F-shaped section between the aforesaid first integral molded guide rail and second integral molded guide rail and against the two surfaces capable of being supported while abutting against the end part of the board of the aforesaid board holder under a state in which the engagement claws of the board holder are being fixed to the bottom surface of the aforesaid TV device while being engaged with the aforesaid engagement holes, and the aforesaid board is supported substantially in parallel with the bottom surface of the TV device.

That is, the present invention is effective as being realized as the cabinet having the aforesaid practical configuration and the present invention may provide the cabinet in which the cooling speed in the die is made fast and vibrating sound can be easily prevented while the pulling taper is being arranged.

Other and further objects, features and advantages of the invention will appear more fully from the following description.

BRIEF DESCRIPTION OF THE DRAWINGS

A preferred form of the present invention illustrated in the accompanying drawings in which.

DESCRIPTION OF THE PREFERRED EMBODIMENTS

Figure 1:
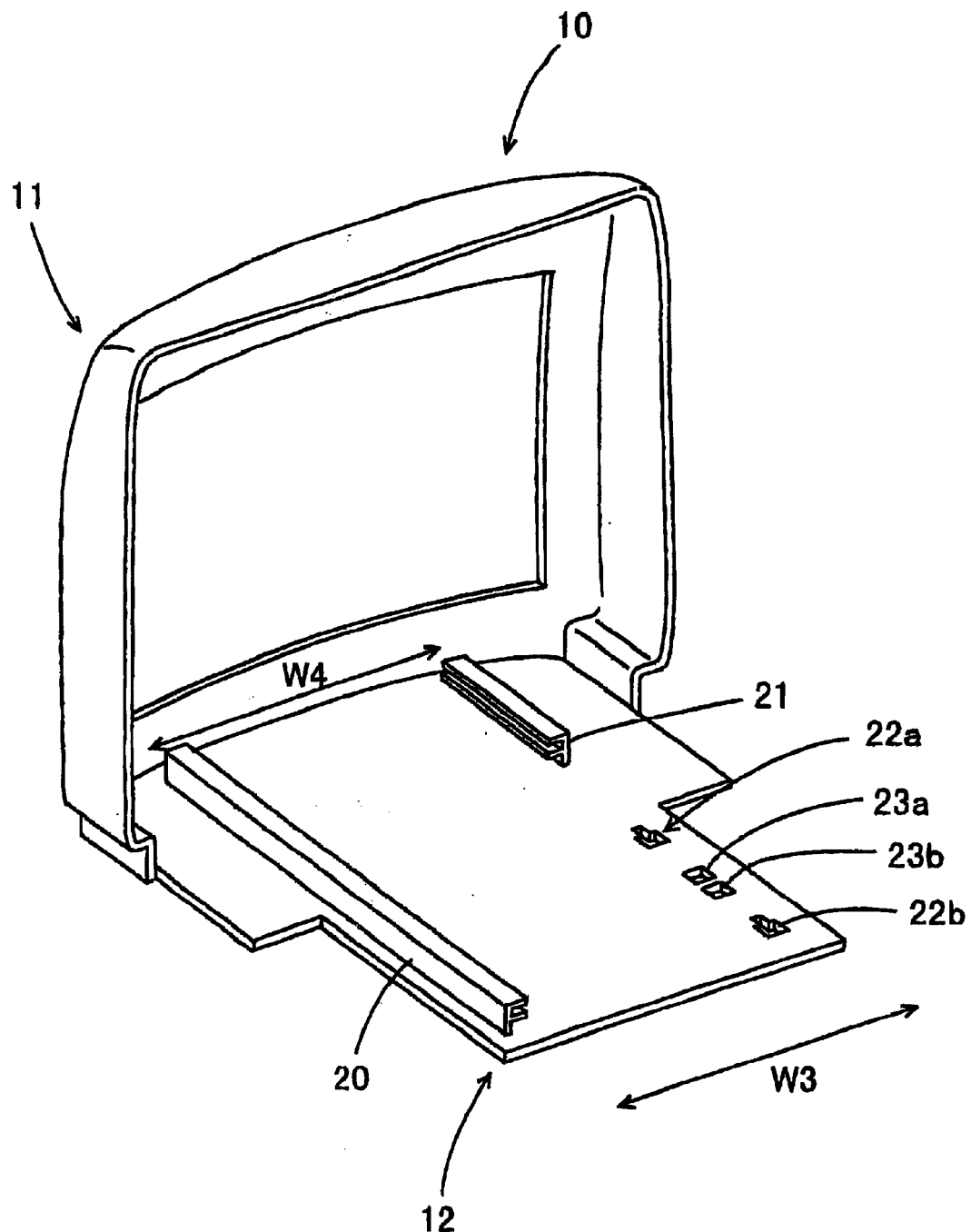
FIG. 1 is a perspective view for showing an outer appearance of a front cabinet of a television device in accordance with one preferred embodiment of the present invention.

Referring now to the drawings, some preferred embodiments of the present invention will be described as follows.

FIG. 1 is a perspective view for showing an outer appearance of a front cabinet of a television device in accordance with one preferred embodiment of the present invention. In this figure, the front cabinet 10 is constructed such that a front surface part 11 having an opening for use in directing a fluorescent surface of a Picture tube fixed in the cabinet, and a chassis 12 for use in assembling the board provided with various kinds of circuits realizing various kinds of function of the television device are connected at a substantial right angle. That is, the chassis 12 in the preferred embodiment corresponds to a predetermined wall surface in a case.

An integral molded guide rail 20 having substantial same length as a forward or rearward length of the chassis 12 and an integral molded guide rail 21 having substantial ⅓ of the forward or rearward length of the chassis 12 are arranged in pairs on both edges of the chassis 12. In addition, engagement holes 22a, 22b and stopper holes 23a, 23b are opened at predetermined positions in the chassis 12 on the extended line of the longitudinal direction of the integral molded guide rail 21.

Figure 2:
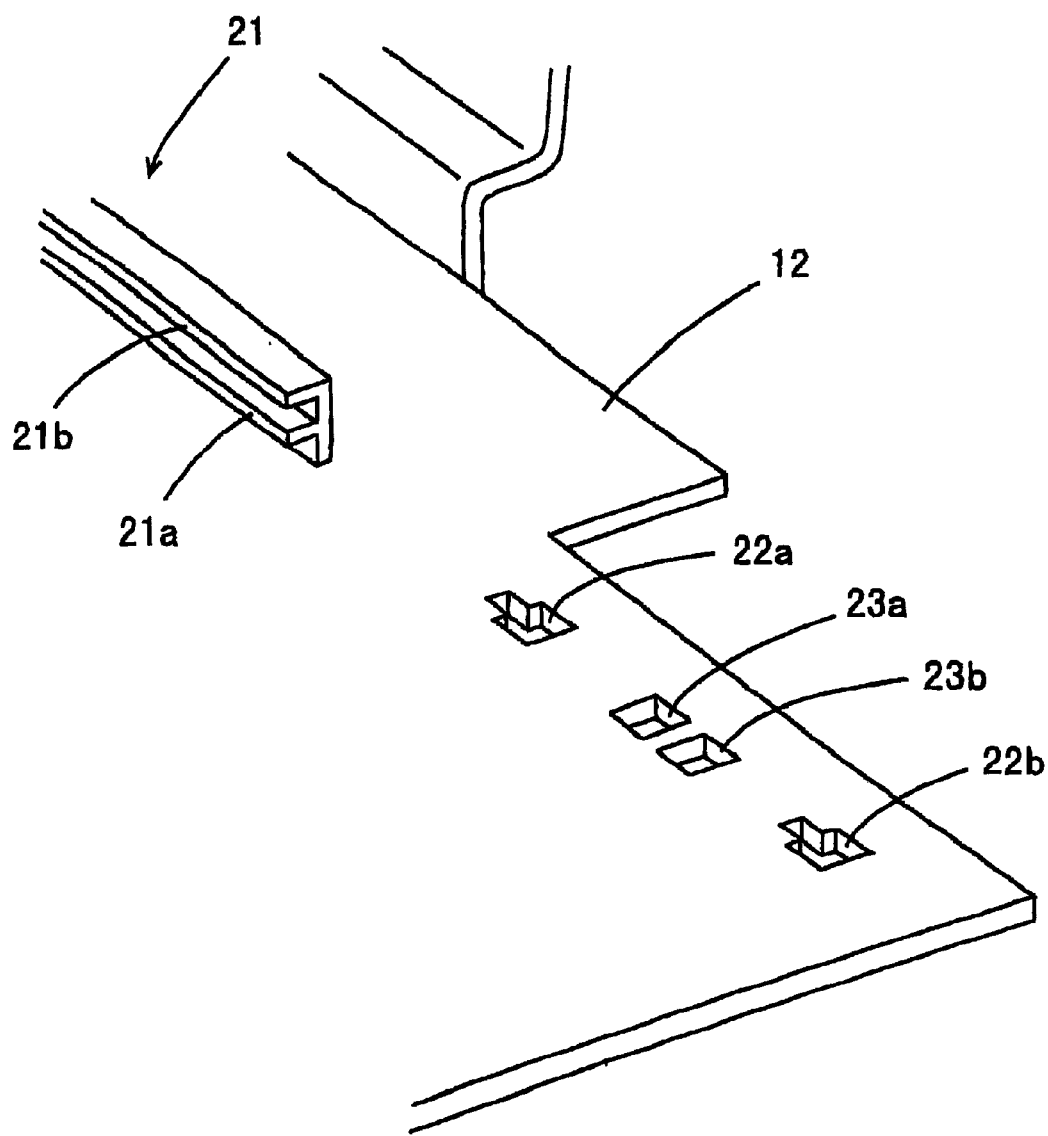
FIG. 2 is a substantial part enlargement view for showing an integral molded guide rail.

FIG. 2 shows, in an enlarged form, the substantial portions of the aforesaid molded guide rail 21, engagement holes 22a, 22b and stopper holes 23a, 23b. In this figure, the integral molded guide rail 21 projects above the chassis 12 and is provided with a lower rail 21a and an upper rail 21b bent at a substantial right angle in an inward direction. That is, the integral molded guide rail 21 is formed to have a substantial F-shaped form in section. At this integral molded guide rail 21, it is possible that a board is slid and inserted between the lower rail 21a and the upper rail 21b.

In addition, the integral molded guide rail 20 has the same symmetrical shape as that of the integral molded guide rail 21 at the opposite end of the aforesaid integral molded guide rail 21 of the aforesaid chassis 12, that is, the integral molded guide rails 20, 21 are arranged to be oppositely faced against to each other. Although the integral molded guide rail 20 has the same shape as that of the aforesaid integral molded guide rail 21, they are different in their forward or rearward length as described above. Also in this integral molded guide rail 20, the board can be inserted between the lower rail and the upper rail. Accordingly, the integral molded guide rail 20 and the integral molded guide rail 21 can support the board having a substantial width W3 indicated in the aforesaid FIG. 1. In addition, these integral molded guide rails 20, 21 are molded while their distance being slightly changed, wherein W4 indicated in this figure is slightly smaller than W3 and there is provided a removing taper which is preferable when the front cabinet 10 is pulled out of a die in a forward direction.

In turn, the aforesaid engagement holes 22a, 22b are arranged at the symmetrical positions of the stopper holes 23a, 23b, wherein the engagement hole 22a is arranged at the forward portion of the chassis 12 and the engagement hole 22b is arranged at the rearward portion of the chassis 12. The engagement holes 22a, 22b have such a shape as one in which two rectangles of different size are merged to each other, and the shape is a substantial convex shape. In addition, the hole corresponding to a small rectangle in the convex shape is constructed to face toward the forward direction of the aforesaid front surface cabinet 10, the board to be described later is moved in a forward direction to enable the engagement claws of the board holder to be fitted into the shape. The stopper holes 23a, 23b are substantial rectangular holes and have such a shape as one enabling protrusions of flexible pieces of the board holder described later to be fitted.

Figure 3:
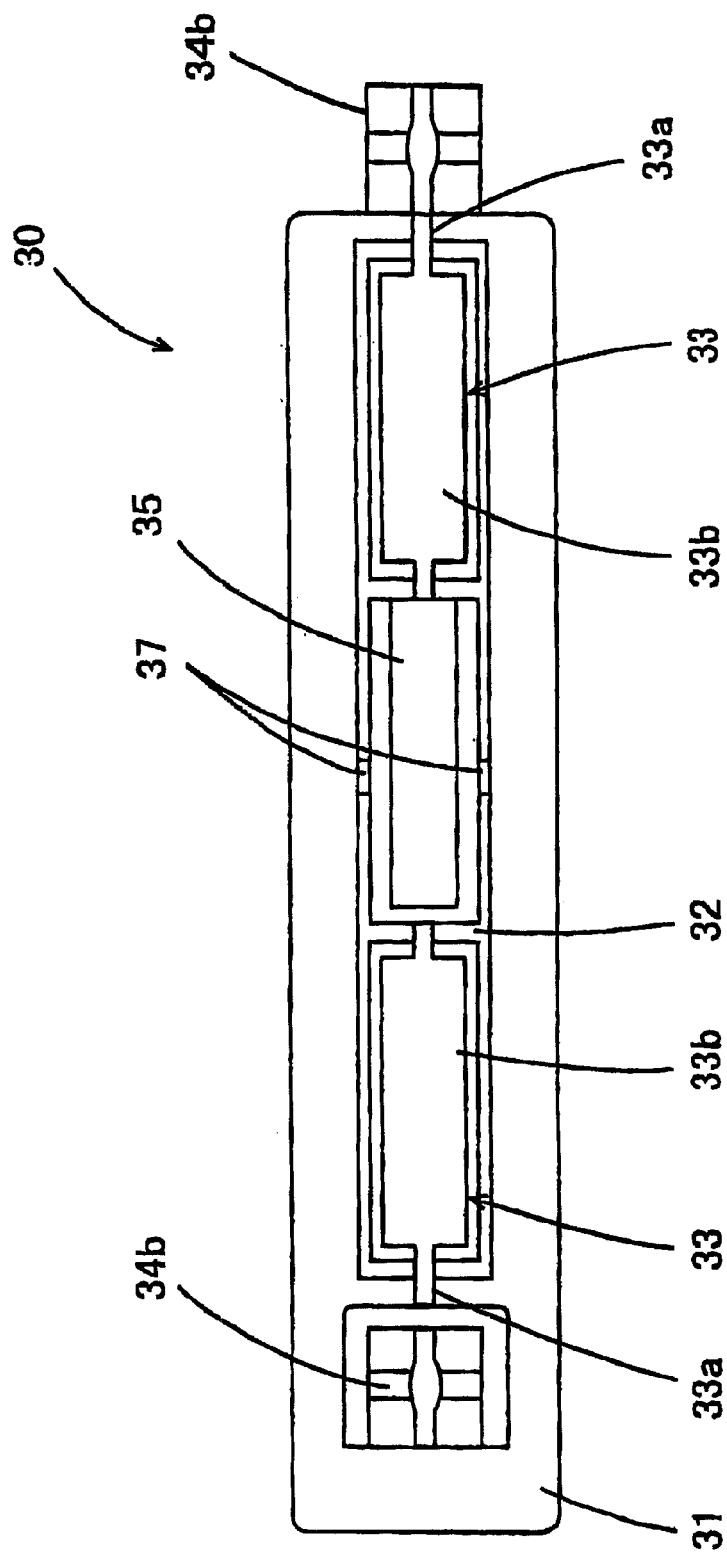
FIG. 3 is a top plan view for showing a board holder.
Figure 4:
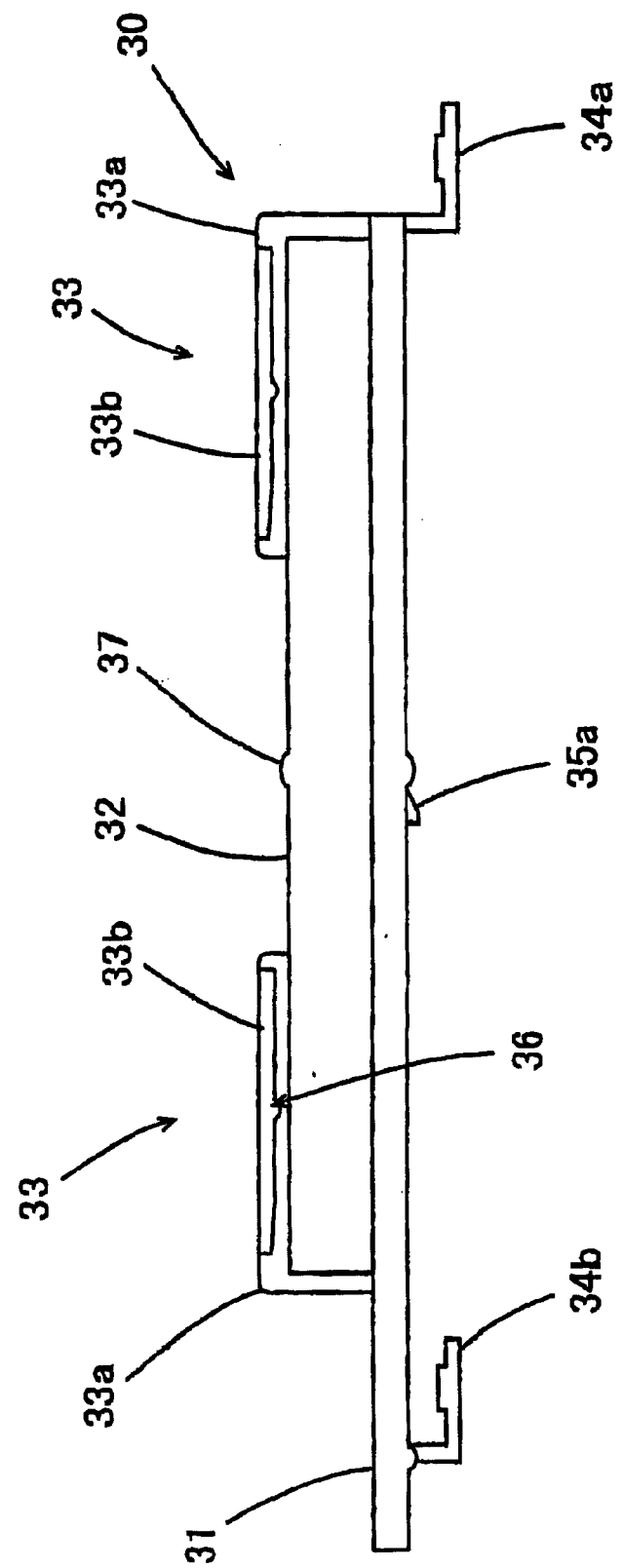
FIG. 4 is a front elevational view for showing a board holder.

FIG. 3 is a top plan view for showing the board holder 30. FIG. 4 is a front elevational view for showing the board holder 30. In FIG. 4, the board holder 30 is constituted by a vertical installing portion 32 vertically installed from a flange portion 31; guide portions 33 arranged at both ends in right and left directions of a sheet at the upper part of the vertical installing portion 32; engagement claws 34a, 34b extended and arranged at the lower part of the flange portion 31; and a flexible piece 35 arranged at the lower central part of the vertical installing portion 32.

The vertical installing portion 32 is vertically installed from the flange portion 31 and is divided into three cylindrical segments passing through in a vertical installing direction, the cylindrical portions at both ends further pass through the aforesaid guides 33. That is, the guides 33 are substantially in parallel with the vertical installing direction of the vertical installing portion 32, the plate portions 33a passing in the rightward or leftward direction in the sheet through cylindrical portions at both ends of the vertical installing portion 32 and the plate portions 33b arranged substantially in parallel with the aforesaid flange portion 31 above the former plate portions are connected to each other.

That is, the plate portions 33b are set such that their lower surfaces are substantially in parallel with the upper end surfaces of the vertical installing portion 32, they are oppositely faced to each other with a certain clearance being left, the board can be inserted between them and they form a groove-like guide rail. Further, the plate portion 33b has a thickness gradually thin at the left end in the sheet in FIG. 4 and it is formed such that the board may easily be inserted from the left end of the sheet. In turn, a substantial central part of the lower surface of the plate portion 33b is provided with a downward-directed protrusion 36, the protrusion 36 abuts against the upper surface of the board when the board is inserted between the plate portion 33b and the upper end surface of the vertical installing portion 32, the board is biased downwardly to cause the lower surface of the board to be abutted against the upper end surface of the vertical installing portion 32.

An upward-directed protrusion 37 is arranged at the central part of the upper end surface of the vertical installing portion 32 between the aforesaid guide portions 33, the protrusion 37 is abutted against the lower surface of the inserted board at the central part of the upper end surface of the vertical installing portion 32 and then the board is biased upwardly. Accordingly, when the board is inserted, the board is biased in an alternative direction by the board guide portions 33 and the protrusion 37 so as to prevent a vibrating sound from being generated at the plate portions 33b and the upper end surface of the vertical installing portion 32.

The lower central part of the vertical installing portion 32 is provided with a flexible piece 35 molded into a substantial plate shape with its one end being connected to the vertical installing portion 32. An outer circumference of the flexible piece 35 is smaller than an inner circumference of the central cylindrical portion formed by the central cylindrical portion. The flexible piece 35 is connected to the vertical installing portion 32 only at its one end, so that it can be flexed in an upward or downward direction with this connected portion being applied as a fulcrum point. The lower surface of the flexible piece 35 is provided with a protrusion 35a that can be fitted to the aforesaid stopper holes 23a, 23b while facing downwardly and it is inclined from the left side to the right side in the sheet in FIG. 4.

Accordingly, when the board holder 30 is slid and moved toward the front side of the chassis 12 under a state in which the protrusion 35a is being inserted into the stopper hole 23b, the protrusion 35a is flexed upwardly while being abutted against a part of the stopper hole 23b to cause the flexible piece 35 to be once retracted upwardly, the protrusion 35a is fitted to the stopper hole 23a when the protrusion 35a reaches the stopper hole 23a and at the same time the board holder 30 is prevented from being automatically moved in an opposite direction.

In turn, both right and left ends of the flange portion 31 as viewed in the sheet are provided with engagement claws 34a, 34b. The engagement claws 34a, 34b are extended from the lower surface of the flange portion 31 in a downward direction and they are molded such that they are bent at a substantial right angle in the rightward direction as viewed in the sheet. That is, the engagement claws 34a, 34b have a substantial L-shape in section, he board holder 30 is slid forwardly while it is being inserted into the engagement holes 22a, 22b to hold and engage with the chassis 12 between the engagement claws 34a, 34b and the flange portion 31. In addition, a part of both surfaces of the engagement claws 34a, 34b is provided with an upward-directed protrusion. When they are engaged, the protrusions abut against the lower surface of the chassis 12 to prevent a vibrating sound from being generated between the chassis 12 and the board holder 30.

Figure 5:
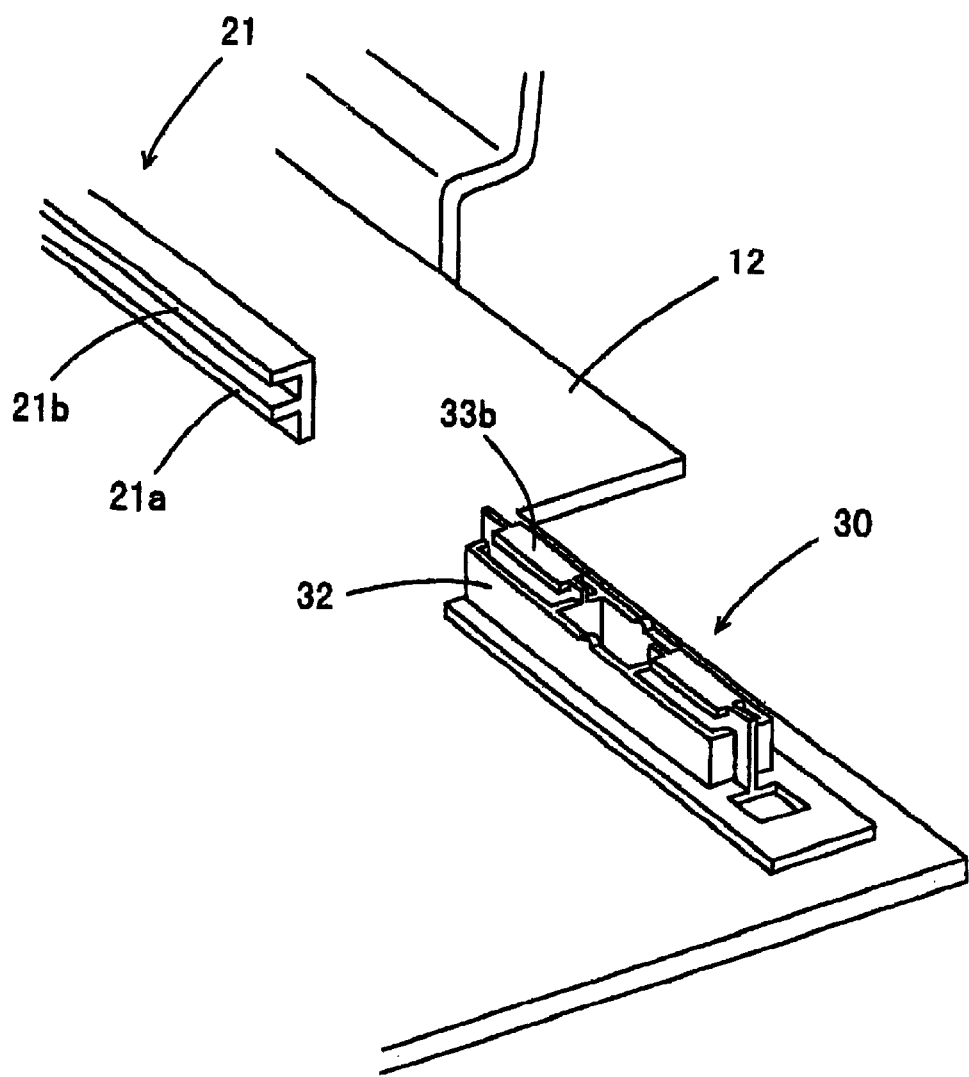
FIG. 5 is a perspective view for showing a state in which the aforesaid board holder is engaged with and fixed to a chassis.

FIG. 5 is a perspective view for showing a state in which the aforesaid board holder 30 is engaged with and fixed to the aforesaid chassis 12. In this figure, the board holder 30 is vertically installed from the chassis 12 under its engaged and fixed state, wherein the upper end surface of the aforesaid vertical installing portion 32 and the upper end surface of the lower rail 21a of the integral molded guide rail 21 are positioned at the substantial same plane. In turn, the lower surface of the plate portion 33b of the aforesaid guide 33 and a lower end surface of the upper rail 21b of the aforesaid integral molded guide rail 21 are positioned in the substantial same plane. Accordingly, the groove-like guide rail formed by the lower rail 21a and the upper rail 21b of the integral molded guide rail 21 and a groove-like guide rail formed by the upper end surface of the vertical installing portion 32 and the plate portion 33b of the guide 33 are constituted to be positioned on a substantial linear line, the edges of the board are inserted into these guide rails and the board can be inserted forwardly in a forward direction of the front cabinet 10 while it is being slid.

As described above, when the board 40 is stored along a wall surface of the chassis 12 within the casing of the cabinet of the present invention, the aforesaid wall surface is provided with the groove-like integral molded guide rail 21 where the edges of the board 40 can be inserted from one end toward a deep side and supported by it, although the groove-like guide rail is constituted at the board holder 30 in which the end having the aforesaid board 40 inserted is removably fitted.

As described above, the end at the groove-like guide rail where the board is inserted can be fixed or removed as the board holder 30, and it is separately formed when it is molded. When the long groove-like guide rail is formed, a sufficient amount of pulling taper is required. However, since it is formed as a separate component, its slight pulling taper is sufficient.

Figure 6:
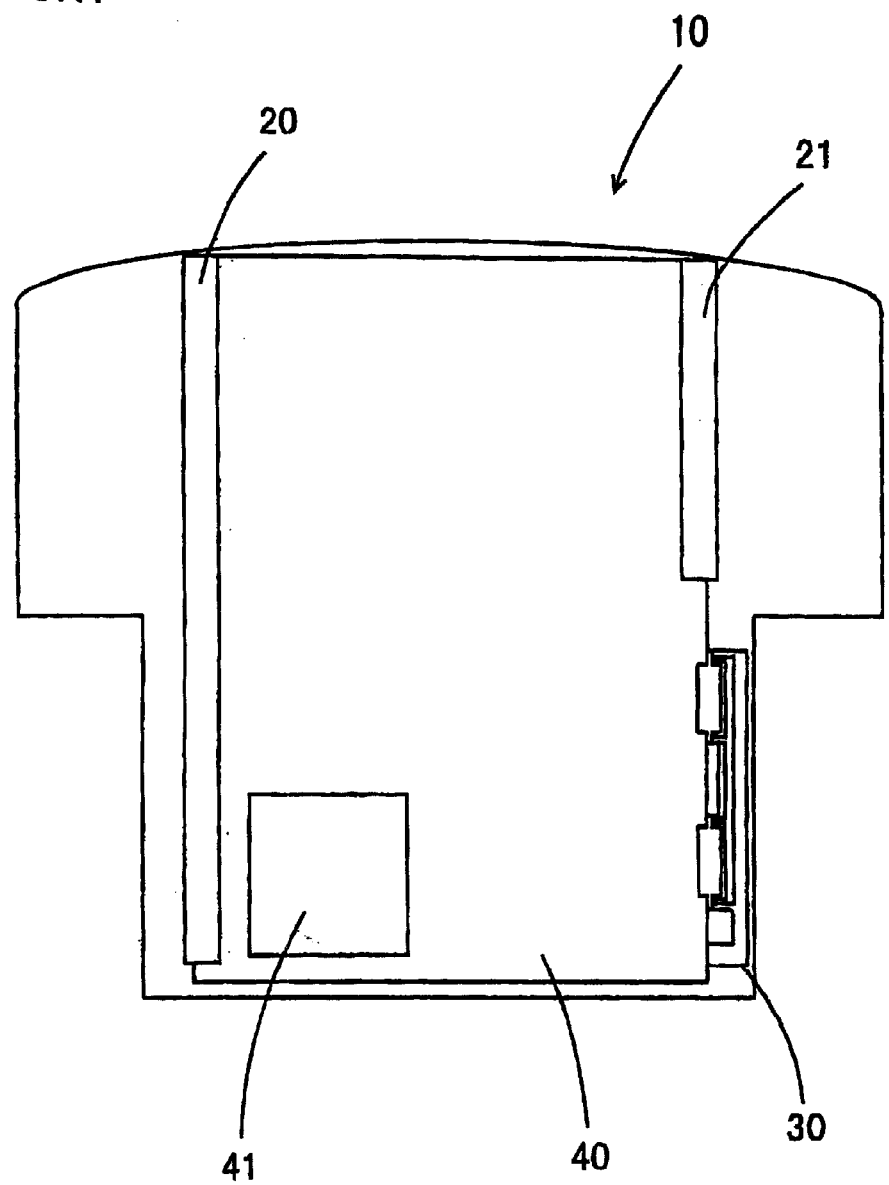
FIG. 6 is a top plan view for showing a front cabinet under a state in which the board is slid and inserted into the front cabinet.
Figure 7:
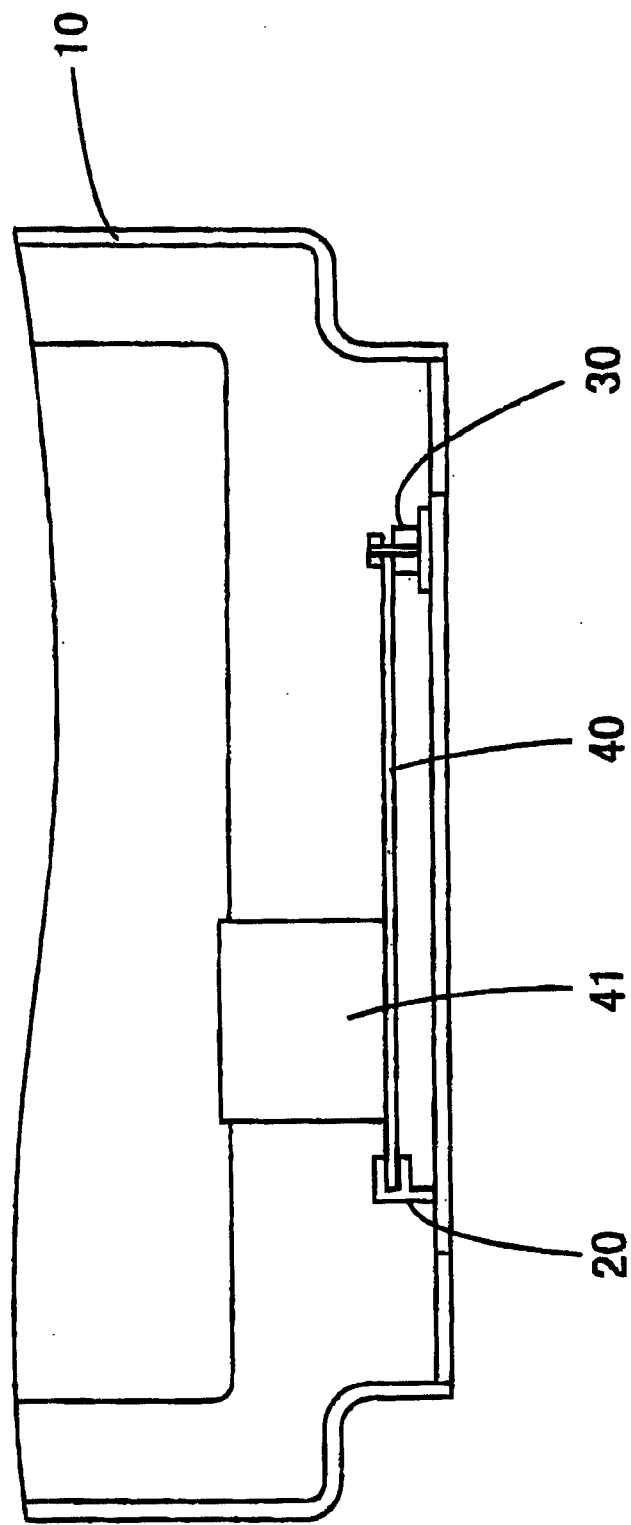
FIG. 7 is a rear view for showing a front cabinet under a state in which the board is slid and inserted into the front cabinet.

FIG. 6 is a top plan view for showing the front cabinet 10 under a state in which the board 40 is slid and inserted into it, and FIG. 7 is a rear view for showing the front cabinet 10 under a state in which the board 40 is slid and inserted into it. In these figures, a fly-back transformer 41 heavier than other circuit components is clearly illustrated on the board 40. When the board 40 is slid and inserted while both ends of the board 40 in its width direction are being supported by the groove-like guide rails of the aforesaid integral molded guide rails 20, 21, the board 40 is inserted into a forward deeper side of the front cabinet 10. At this time, the end part of the board 40 on the extended line of the integral molded guide rail 21 is guided by the board holder 30, and the board holder 30 supports the board 40 while giving a biasing force toward the board 40 under a state in which the board 40 is inserted into the forward deep side of the cabinet as shown in FIGS. 6 and 7.

Accordingly, the board holder 30 reduces looseness between the board 40 and the board holder 30, and between the chassis 12 and the board holder 30, i.e. looseness in an upward or downward direction under an action of the aforesaid protrusion 36 or the like and at the same time it also reduces looseness in a width direction by biasing it toward the board 40, resulting in that the vibrating sound can be effectively prevented. The fly-back transformer 41 is electrically connected and positioned near the integral molded guide rail 20 at the board 40. In this case, since the fly-back transformer 41 is positioned near the integral molded guide rail 20, its weight may act more to the integral molded guide rail 20 than to the integral molded guide rail 21. Since the integral molded guide rail 20 is integrally molded against the front cabinet 10, even if such a weight of heavy weight item may act on it, its weight can be supported positively.

In this way, in the case of the aforesaid preferred embodiment, it becomes possible to prevent a vibrating sound from being generated even if the pulling taper is being provided and further it becomes possible to attain a fast cooling speed within a die because the integral molded guide rail 21 can be constituted in a short length. Actually, the cooling time for the front cabinet for the mass-production-based 13-inch TV device was shortened by 3 to 5 seconds. With such an arrangement as above, manufacturing of 72 front cabinets per one hour in the prior art could be increased to 76 front cabinets per hour in accordance with the present invention. In the aforesaid preferred embodiment, although it was preferable in particular when the weight on the board 40 was not equally distributed, the present invention is not necessarily limited to the aforesaid configuration to improve a cooling speed within the die, and it may also be applicable that both pairs of guide rail are shortened.

Figure 8:
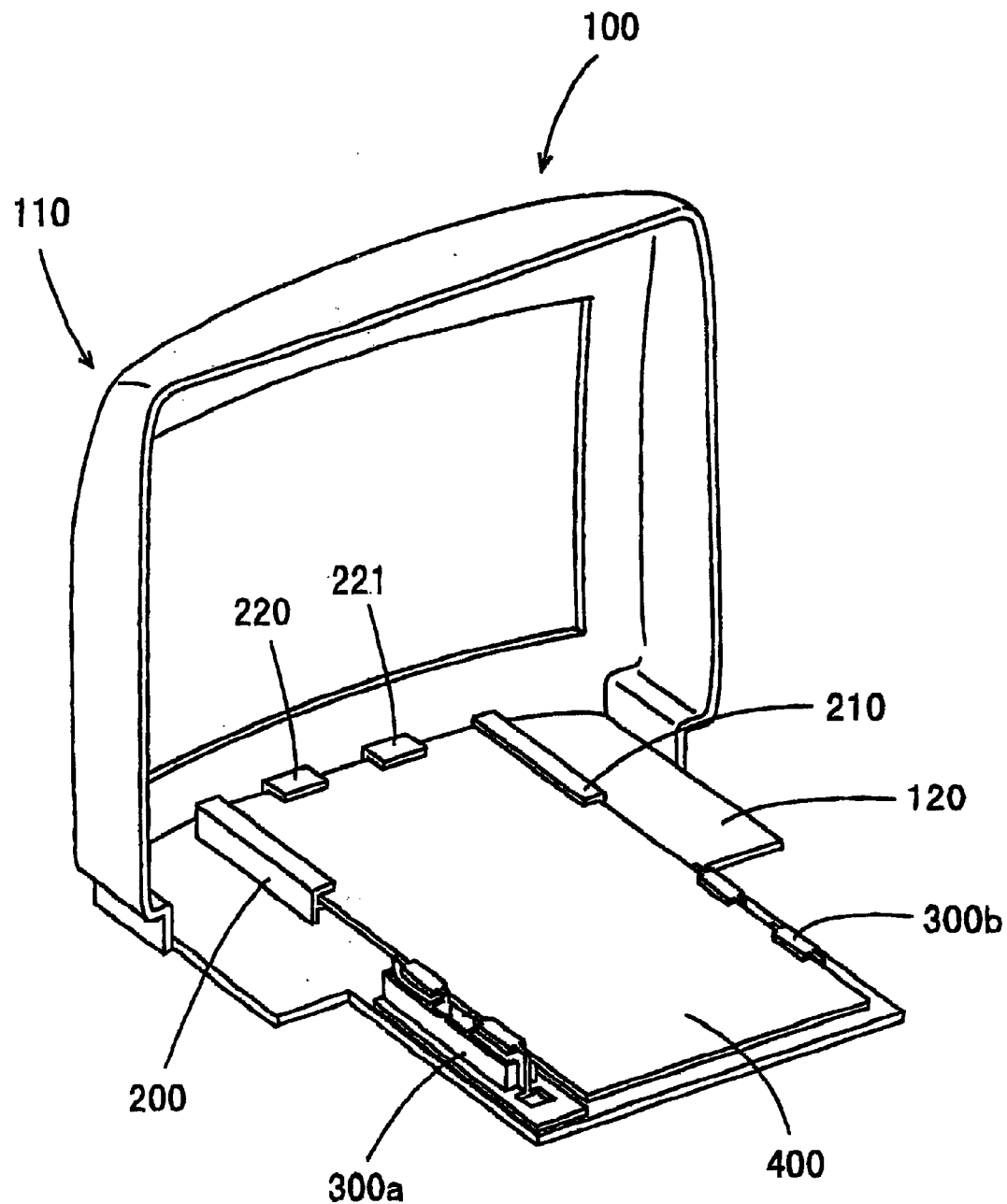
FIG. 8 is a perspective view for showing a front cabinet in accordance with a second preferred embodiment of the present invention.

FIG. 8 is a perspective view for showing a front cabinet 100 in accordance with a second preferred embodiment of the present invention. In this figure, the front cabinet 100 is constructed such that a front part 110 having an opening for directing a fluorescent surface of the Braun tube in a forward and outward direction and a chassis 120 having a board provided with various kinds of circuits for realizing various kinds of functions of the TV device are connected at a substantial right angle to each other. A pair of integral molded guide rails 200, 210 having a length of about ⅓ of a length in a forward or rearward direction of the chassis 120 are arranged on both front edges of the chassis 120. Further, predetermined groove-like guide rails 220, 221 are molded at a rear lower side of the front part 110. The grooves formed by these guide rails 220, 221 are positioned at the substantial same height as that of the aforesaid integral molded guide rails 200, 210 so as to support the front edge of the board 400 under a state in which the board 400 is slid and inserted into the deep side.

Further, the engagement holes and the stopper holes (not shown) are opened at the predetermined position of the chassis 120 on the rearward extended lines of the integral molded guide rails 200, 210. That is, the board holder can be engaged with and fixed to the extended lines of both integral molded guide rails 200, 210. Configuration of the engagement holes, stopper holes and board holder in the preferred embodiment and a positional relation of the component elements are similar to those shown in the first preferred embodiment, wherein a board 400 can be slid and inserted while the board holders 300a, 300b are being engaged with and fixed to, and then the board 400 can be supported by the integral molded guide rails 200, 210 and the board holders 300a, 300b. If the two board holders 300a, 300b are constituted in such a way that they can be fixed, both integral molded guide rails 200, 210 can be molded in a short length, so that a speed when the front cabinet 100 is cooled within a die can be made more fast.

Figure 9:
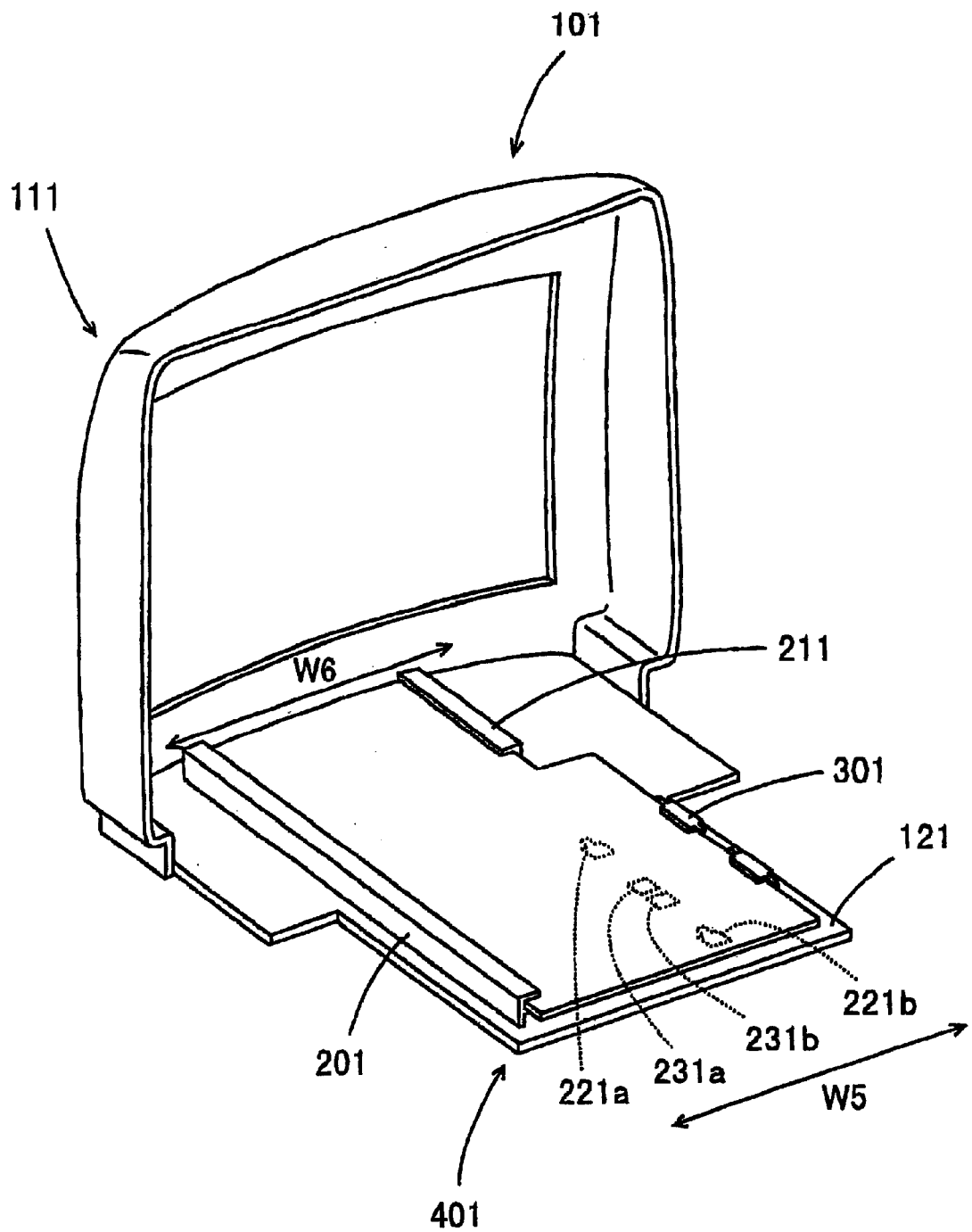
FIG. 9 is a perspective view for showing a front cabinet in accordance with a third preferred embodiment of the present invention.
Figure 10:
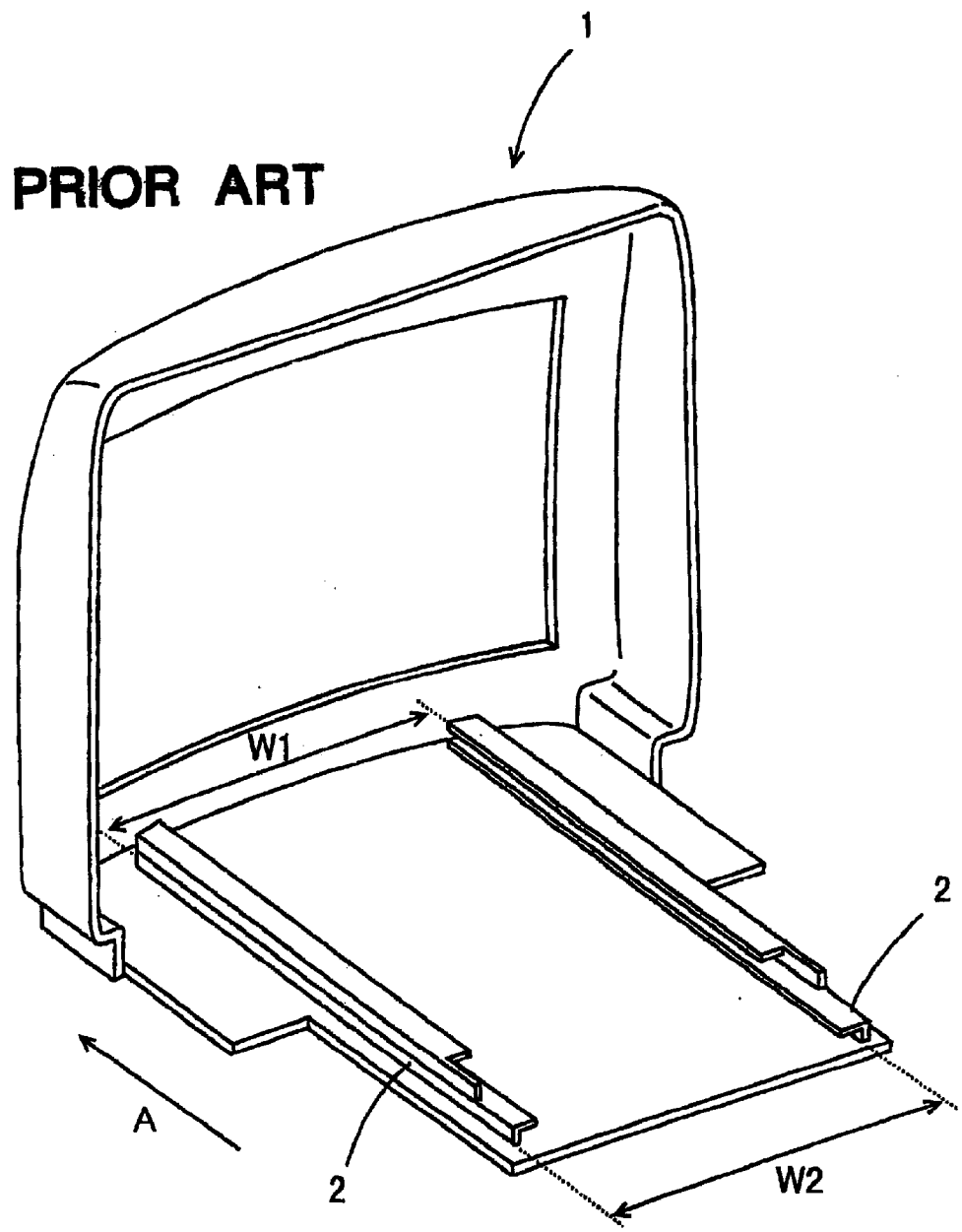
FIG. 10 is a perspective view for showing a front cabinet of the prior art television device.

FIG. 9 is a perspective view for showing a front cabinet 101 in accordance with a third preferred embodiment of the present invention. In this figure, the front cabinet 101 is constructed such that a front part 111 having an opening for directing a fluorescent surface of the Braun tube in a forward and outward direction and a chassis 121 assembled with a board having various kinds of circuits for realizing various kinds of functions of the TV device are connected at a substantial right angle to each other. An integral molded guide rail 201 having a substantial same length as the length in a forward or rearward direction of the chassis 121 is arranged on a left side edge of the chassis 121 as viewed in the sheet. The integral molded guide rail 211 having a length of substantial ⅓ of the former one is arranged at a substantial central front side of the chassis 121 while it is oppositely faced against said integral molded guide rail 201.

Further, the engagement holes 221a, 221b and the stopper holes 231a, 231b are opened at the predetermined positions of the chassis 121 on the rearward extended lines of the integral molded guide rails 211. That is, the board holder can be engaged with and fixed to the extended line of the integral molded guide rail 211. In the preferred embodiment of the present invention, the engagement holes and the stopper holes (not shown) of the chassis 121 are opened on the right edge of the chassis 121 as viewed in the sheet, and the board holder can also be engaged with and fixed on the edge. In this way, since the board holder can be engaged with and fixed at a plurality of positions, a degree of freedom corresponding to the width of the board 401 in the preferred embodiment is increased.

That is, when the board holder is fixed on the extended line of the integral molded guide rail 211, the rectangular boards 40, 400 described above can be inserted into and supported. Further, when the board holder 301 is engaged with and fixed to the chassis 121, it is possible to support the board 401 of which width is varied in a stepwise manner as shown in FIG. 9. That is, when the board is slid and inserted while a part of a width W6 of the board 401 is being faced at a front side, the part of the width W6 of the board can be supported at the integral molded guide rails 201, 211. In addition, the integral molded guide rail 201 and the board holder 301 can support the part of the width W5 of the board. In the preferred embodiment of the present invention, it becomes possible to adapt the width of the board in a flexible manner as described above and it can easily be adapted for a step-up model and the like.

As described above, when the board is stored in the casing along the predetermined wall surface in the present invention, the integral molded guide rail integrally molded with the aforesaid casing to support the front end of the aforesaid board and the board holder constituted by a component separate from the aforesaid integral molded guide rail are constituted. Accordingly, it is not necessary to have a long rail or the like with a substantial same length as that of the board oppositely faced against as the integral molded guide rail, and then a speed when the molded product is cooled in a die is made fast. Further, since the board holder is a separate component, it is possible to reduce looseness between the board and the guide rail in an easy manner.

The foregoing invention has been described in terms of preferred embodiments. However, those skilled, in the art will recognize that many variations of such embodiments exist. Such variations are intended to be within the scope of the present invention and the appended claims.

What is claimed is:

1. A cabinet covering a circumferential edge of a fluorescent surface of a picture tube of a TV device, the cabinet being extended to form a bottom surface of the TV device and supporting a board substantially in parallel with said bottom surface, comprising:

a second integral molded guide rail having a length substantially ⅓ of the length of said board, the second guide rail being integrally molded to the bottom surface substantially parallel to the forward or rearward direction of said TV device, the second guide rail having a substantially F-shaped cross-section installed vertically from said bottom surface toward the interior of the TV device so as to oppositely face against said first integral molded guide rail, wherein said board is insertable or supportable on the bottom surface between the substantially parallel two planes formed by the substantially F-shaped cross-section;

a board holder comprised of a vertical portion formed, at an upper part, with two surfaces for holding end parts of said board and for supporting said board while abutting against the end parts of the board with predetermined protrusions, the board holder being vertically installed to enable said two surfaces to support the board at a height similar to that of the board supported by said second integral molded guide rail, wherein the board holder further comprises an extended portion which extends in a flange manner against the vertical portion and engagement claws engageable with predetermined engagement holes arranged in the bottom surface at a lower part of the extended portion; wherein said board is slid and inserted between the substantially parallel two planes of the substantially F-shaped cross-sections of said first integral molded guide rail and second integral molded guide rail, and between the two surfaces of the board holder for holding the end parts of board under a state in which the engagement claws of the board holder are detachably fixed to the bottom surface of said TV device via said engagement holes, and further wherein said board is supported substantially parallel to the bottom surface of the TV device.

2. A cabinet in which a board is supported by grooved guide rails adapted to receive edges of said board when said board is inserted and arranged along a predetermined wall of a casing, wherein;

said grooved guide rails are integrally molded with said casing and support a front end of said board; and comprising a board holder adapted to be vertically installed on the predetermined wall in a detachably fixed manner, an upper end of the board holder having a grooved guide rail extending in a direction substantially perpendicular to a vertical installation direction, wherein said board is slideable and insertable in the grooved guide rail of the board holder wherein said board holder and each of said grooved guide rails are positioned on said predetermined wall.

3. A cabinet according to claim 2, wherein, said grooved guide rails are molded so as to oppositely face each other and molded to support each of a left end and a right end of said board, at least one of said grooved guide rails having a length substantially between ¼ to ½ of the length of said board.

4. A cabinet according to claim 3, wherein;

said cabinet is molded in a predetermined die; and wherein a pulling taper is provided, in which a distance between said oppositely facing grooved guide rails is gradually shortened as said cabinet is pulled out of said die.

5. A cabinet according to claim 2, wherein;

said board holder is detachably fixed in a position on the a bottom surface of said predetermined wall, and wherein said board holder is biased toward said board when said board is supported.

6. A cabinet in which a board is supported by grooved guide rails adapted to receive edges of said board when said board is inserted and arranged along a predetermined wall of a casing, wherein;

said grooved guide rails are integrally molded with said casing and support a front end of said board; and comprising a board holder adapted to be vertically installed on the predetermined wall in a detachably fixed manner, an upper end of the board holder having a grooved guide rail extending in a direction substantially perpendicular to a vertical installation direction, wherein said board is slideable and insertable in the grooved guide rail of the board holder, and engagement claws arranged at a lower part of the board holder having substantially L-shaped cross-sections, engagement holes in the predetermined wall being engageable by said engagement claws and being arranged at positions so as to fix said board holder at a predetermined wall surface in said cabinet, said board holder being moveable in substantially the same direction as that of said board when said board is supported in said grooved guide rails, whereby said engagement claws engage with the engagement holes.

7. A cabinet according to claim 6, wherein; said engagement holes are arranged at a plurality of positions in the predetermined wall surface in said cabinet and said board holder can be engaged at a plurality of positions.

8. A cabinet according to claim 6, wherein;

at least one of two surfaces of said board holder is provided with a protrusion that abuts against an end of said board.

9. A cabinet according to claim 6, wherein a flexible piece is formed on the lower part of the board holder and a protrusion is formed toward the bottom surface in said cabinet, the bottom surface of the cabinet having a stopper hole to which said protrusion can be fitted, said protrusion and said stopper hole being fitted under a state in which said engagement claws are engaged with the engagement holes, whereby the board holder is prevented from being moved in such a direction as one in which the engagement between the engagement claws and the engagement holes is released.

10. A cabinet according to claim 6, wherein a flexible piece is formed on the lower part of the board holder and a protrusion is formed toward the bottom surface in said cabinet, the bottom surface of the cabinet having a stopper hole to which said protrusion can be fitted, said protrusion and said stopper hole being fitted under a state in which said engagement claws are engaged with the engagement holes, whereby the board holder is prevented from being moved in such a direction as one in which the engagement between the engagement claws and the engagement holes is released.

11. A cabinet, comprising:

grooved guide rails capable of receiving edges of a board inserted therein from a rearward end of the cabinet toward a forward end of the cabinet, the grooved guide rails supporting the board along a predetermined wall surface of the cabinet when said board is arranged along said wall surface, and wherein a rearward end portion of at least one of said grooved guide rails is detachably fixed to the predetermined wall surface of the cabinet; and a board holder including said at least one of said grooved guide rails, said board holder and each of said grooved guide rails being positioned on said predetermined wall surface.

* * * * *